United States Patent [19]

Winter

[11] 4,190,423
[45] Feb. 26, 1980

[54] METHOD OF OPERATING AN ADSORPTION FILTER

[75] Inventor: Karl Winter, Dortmund-Sölde, Fed. Rep. of Germany

[73] Assignee: CEAG Ceagfilter und Entstaubungstechnik GmbH, Dortmund, Fed. Rep. of Germany

[21] Appl. No.: 880,224

[22] Filed: Feb. 21, 1978

[30] Foreign Application Priority Data

Feb. 19, 1977 [DE] Fed. Rep. of Germany ....... 2707226

[51] Int. Cl.$^2$ ............................................. B01D 53/04
[52] U.S. Cl. ............................................ 55/20; 55/62; 55/74
[58] Field of Search ....................... 55/20, 62, 74, 163, 55/179, 387

[56] References Cited

U.S. PATENT DOCUMENTS

| 3,359,706 | 12/1967 | Zankey | 55/20 |
|---|---|---|---|
| 3,731,458 | 5/1973 | McGrath, Jr. | 55/179 X |
| 3,883,325 | 5/1975 | Fuhring et al. | 55/20 |
| 3,902,874 | 9/1975 | McAndrew | 55/74 |
| 3,905,783 | 9/1975 | Winter et al. | 55/74 X |
| 3,930,803 | 1/1976 | Winter | 55/84 X |
| 4,023,939 | 5/1977 | Juntgen et al. | 55/79 X |
| 4,083,701 | 4/1978 | Noack | 55/20 |
| 4,088,460 | 5/1978 | Winter | 55/387 X |

*Primary Examiner*—Robert H. Spitzer
*Attorney, Agent, or Firm*—Herbert L. Lerner

[57] ABSTRACT

Method of separating vaporous or gaseous impurities from an air or gas flow by means of an adsorption filter wherein, after the filter has attained a predetermined loading of the impurities, the impurities absorbed in the filter together with an inert gas produced by stoichiometric combustion and conducted in a circulatory loop through the adsorption filter, are fed desorbed and together with excess gas escaping from the circulatory loop to a combustion chamber and consumed in the combustion chamber with excess air adequate for complete combustion includes supplying the heat energy necessary for the desorption to the ineat gas conducted in the circulatory loop from exhaust gas of the combustion chamber through a heat exchanger traversed by both gas flows and separating both of the gas flows from one another.

4 Claims, 1 Drawing Figure

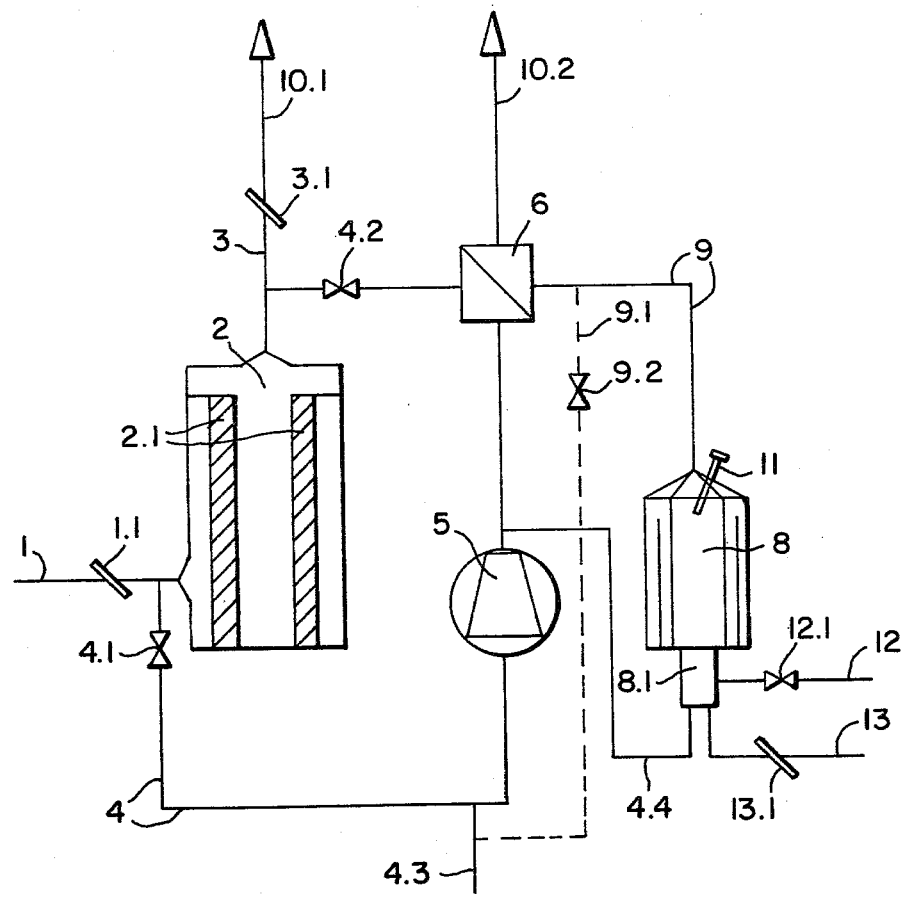

METHOD OF OPERATING AN ADSORPTION FILTER

The invention relates to a method of operating an adsorption filter and, more particularly, to a method of separating vaporous or gaseous impurities out of an air or a gas flow with an adsorption filter wherein, after attaining a given loading, the impurities adsorbed in the adsorption filter together with an inert gas produced by stoichiometric combustion and passed through the adsorption filter in the circulatory loop, is fed, desorbed with the excess gas escaping from the circulatory loop, to a combustion chamber and there burned with an air excess adequate for effecting complete combustion.

Methods are known which remove combustible vaporous or gaseous impurities from an air or gas flow, store them in an adsorption filter and from which, after loading of this adsorption filter, the stored impurities are desorbed and subsequently burned. Such a method is known from German Patent DT-PS 1,195,892 wherein an adsorption filter separates impurities from an air flow. After attaining a predetermined charge or load of these impurities, the latter are desorbed by heating the adsorption filter and are fed with the air flow to a burner disposed downstream of the adsorption filter in the flow direction of the air. It is disadvantageous that, for one thing, the desorption energy, which only partly attains an effective temperature increase because of cooling by the air flow, is to be brought into the system from the outside by an energy carrier, such as oil or gas and the combustion thereof, or through electricity, for example, and that, for another thing, operating conditions can occur wherein the mixture of air and desorbate have a tendency toward ignition or even toward explosion. The latter is avoided in the German Patent DT-PS 2,030,153 in that the desorption occurs with a hot inert gas, and that the air required for combustion is first admixed in a separate desorbate-afterburning device to the mixture of inert gas and desorbate. The advantage of the just-mentioned heretofore known method is that, just as with the method according to the hereinaforementioned German Patent DT-PS 1,195,892, the desorption energy must be fed to the system from the outside, and the heat of combustion of the desorbate remains unused. German Patent DT-PS 1,619,850 attempts to avoid this by setting into operation a gas-circulatory loop for the desorption wherein heated air is initially circulated. After initiating the desorption, desorbate accumulates and is consumed in a contact furnace, and, as a result, the oxygen of the circulatory-loop gas is consumed. Simultaneously, the combustion heat of the desorbate heats up the circulatory-loop gas, the initiated adsorption is accelerated and the increased accumulation of desorbate demands a supply of combustion air. A corresponding fraction of circulatory-loop gas is therefore surrendered to the surroundings. A disadvantage of this last-mentioned method is that, due to the combustion of the desorbate, with a ratio between desorbate and oxygen which is understoichiometric in the normal case, strong-smelling, incompletely oxidized combustion products such as aldehydes or fatty acids can be formed which reach the outside together with the excess gas sluiced out as equivalent for the volume increase of the circulatory-loop gas due to temperature increase, desorbate accumulation and combustion air supply and surrendered to ambient. It is, accordingly, an object of the invention to provide a method of operating an adsorption filter of the foregoing type wherein the desorption energy, in essence, comes from the desorbate combustion per se. Moreover, it is an object of the invention, to provide such a method wherein the occurrence of cracked products or of incompletely oxidized products is obviated.

With the foregoing and other objects in view, there is provided, in accordance with the invention, a method of separating vaporous or gaseous impurities from an air or gas flow by means of an adsorption filter wherein, after the filter has attained a predetermined loading of the impurities, the impurities absorbed in the filter together with an inert gas produced by stoichiometric combustion and conducted in a circulatory loop through the adsorption filter, are fed desorbed and together with excess gas escaping from the circulatory loop to a combustion chamber and consumed in the combustion chamber with excess air adequate for complete combustion, which comprises supplying the heat energy necessary for the desorption to the inert gas conducted in the circulatory loop from exhaust gas of the combustion chamber through a heat exchanger traversed by both gas flows and separating both of the gas flows from one another.

In accordance with another mode of the method invention, the steps of the method include measuring the temperature of the combustion-chamber exhaust gas, and supplying supplementary fuel in accordance with a control value corresponding to the measured temperature of the combustion-chamber exhaust gas.

In accordance with a further mode of the method invention, the steps of the method also include supplying combustion air in accordance with a control value corresponding to the measured temperature of the combustion-chamber exhaust gas.

In accordance with a concomitant mode of the method invention, the steps of the method additionally comprise removing a partial gas flow from a flow of the exhaust gas of the combustion chamber, and feeding the partial gas flow into the circulatory loop for filling up and inertizing the circulatory loop.

In particular, the cyclic method according to the invention is carried out in four sequential method steps during one cycle. The cycle begins with the adsorption phase wherein the air flowing through the adsorption filter (or the gas flowing through the adsorption filter) is purified or cleansed in the adsorption filter and the adsorbent of the adsorption filter becomes loaded. Activated carbon is advantageously proposed as adsorbent, having proven itself in practice for the solution of odor problems; nevertheless, the method of the invention is not restricted to activated carbon. After a predetermined loading of impurities has been attained, the desorption phase then follows wherein the desorbate is expelled and fed to the combustion chamber. Thereafter, the regeneration phase can yet follow wherein, for one thing, materials which are difficult to boil or are difficult to desorb for other reasons and therefore continue to remain in the adsorbent, are driven out and wherein, for another thing, due to thermal action and possibly also due to mild oxidation, a pore structure corresponding to the original pore structure of the adsorbent is restored or reproduced. Finally, the adsorption filter is cooled in the fourth phase of the method according to the invention. After termination of this cooling phase, one can again shift or revert to the "adsorption" operating phase.

Other features which are considered as characteristic for the invention are set forth in the appended claims.

Although the invention is illustrated and described herein as embodied in a method of operating an adsorption filter, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying single FIGURE of the drawing which is a schematic circulatory flow diagram of a system for practicing the method invention of the instant application.

Referring now to the drawing, there is shown therein a line 1 with an opened slide valve 1.1 through which gas flows, during an adsorption phase, into an adsorber 2, is purified from vaporous or gaseous impurities in an adsorbent 2.1, to the extent that those impurities are adsorbable, leaves the adsorber 2 in purified condition through a line 3 with an opened slider valve 3.1 and finally flows away through a line 10.1 to a chimney which introduces the purified exhaust gas into the free atmosphere. After a predetermined loading of the adsorbent 2.1 is attained, a switch-over to a desorption phase is effected through closure of the slider valves 1.1 and 3.1. The circulatory-loop blower 5 is also then set into operation. The gas contained in the circulatory loop 4 preferably flows in counterflow direction to the gas flow direction during the adsorption phase, after the valves 4.1 and 4.2 have been opened; in the course thereof, the gas is passed through a heat exchanger 6. An oxygen-poor and, under certain conditions, even an oxygen-free protective gas from a separate protective gas generator is fed to this circulatory loop through a line 4.3. With a suitable layout or construction of a combustion chamber 8, it is also possible to employ oxygen-poor waste gas from the combustion chamber 8 as the protective gas. This can be effected by providing a line 9.1 shown in broken lines in the FIGURE and having a valve 9.2 connected therein for transferring the combustion-chamber exhaust gas to the protective gas inlet line 4.3. After the burner 8.1 of the combustion chamber 8 has been ignited, hot combustion-chamber exhaust gas is fed through line 9 to the heat exchanger 6, the heat from the exhaust gas being conveyed by heat transfer throught the heat-exchanger surface of the heat exchanger 6 partly to the gas circulating in the circulatory loop and heats up the gas. Through the temperature increase occurring due to desorption of impurities stored in the adsorbent, an increase in the volume of the gas present in the circulatory loop occurs and therewith, an overflow of part of the desorbate-laden inert gas through a line 4.4 to the combustion chamber 8. Through combustion heat introduced into the combustion chamber 8 with the desorbate in addition to the heating value of an auxiliary or supplementary fuel, the temperature of the combustion-chamber exhaust gas increases, the exhaust gas being a measure for the excess air under which the combustion takes place. It is therefore possible to employ this temperature, which is measured with a thermal sensor 11 at the exhaust-gas outlet of the combustion chamber 8, as control value for the feed of the auxiliary or supplementary fuel. To that end, the measured value of the thermal sensor 11 is suitably processed or converted in a non-illustrated control, and a corresponding adjustment value goes to a valve 12.1 in a line 12 through which auxiliary or supplementary fuel is conducted to the burner 8.1. If this control is expanded also to the feed of the combustion air to the burner 8.1, an adjustment value corresponding to the measured value goes from the control to a control slider valve 13.1 in a combustion air feed line 13.

To characterize or define the method invention of the instant application, the following example is provided: The exhaust-gas flow of a dryer of a lacquer or paint shop or installation in an automobile factory had a flow rate of 50,000 m$^3$/hour and a temperature of 80° C. and contained, besides solvents, also other organic substances such as softeners or similar vaporizable materials added to the liquid lacquer or paint and having a mean concentration of 1.89 g/m$^3$. These materials were expelled in the dryer and delivered with the exhaust gas discharged therefrom into one of two parallel-connected adsorption filters, which remained in the adsorption phase, until the adsorbent thereof had received a predetermined loading of the impurities. This instant of time was able to be accurately determined sufficiently for practical requirements by monitoring the concentration of organic substances in the purified exhaust gas. This adsorption phase had a duration of about 9 hours for the adsorption filter under consideration. Thereafter, a switch-over to the desorption phase was effected. To this end, both slider valves 1.1 and 3.1 in the gas feed and in the gas discharge lines 1 and 3, respectively, were closed and the valves 4.1 and 4.2 in the circulatory loop 4 were opened, the circulatory-loop blower 5 was started up and oxygen-poor protective gas was introduced into the circulatory loop 4. After a few minutes, an adequate so-called pre-inertization was attained, the burner of the combustion chamber was then ignited and brought up to full power.

Then, the auxiliary or supplementary fuel consumption thereof was set at 360 kg/h of heating oil EL. After a few minutes, the combustion chamber attained a temperature of 850° C. necessary for the desorbate combustion, and the hot combustion-chamber exhaust gases flowed through the heat exchanger 6 and the exhaust-gas line 10.2 to the exhaust-gas chimney. Through the heat transfer in the heat exchanger 6, the circulatory-loop gas was heated to about 220° C., flowed into the adsorption filter and began to desorb. As a result, predominantly water was initially expelled, the circulatory-loop gas left the adsorption filter at a temperature of about 90° C.; both the temperature-dependent volume increase as well as the volume increase due to the emerging or issuing water vapor or steam thinned out the oxygen that remained due to certain circumstances. After the water was expelled, inert conditions prevailed.

These conditions were reached about 15 minutes after ignition of the burner. Thereafter, the temperature of the circulatory-loop gas leaving the adsorption filter increased. Simultaneously, organic substances left the adsorber on an increased scale and, with excess gas from the circulatory loop, were transfered into the combustion chamber. The additional heating value permitted the combustion-chamber exhaust-gas temperature to increase, a signal to throttle the feed of auxiliary or additional fuel. If the combustion-chamber exhaust-gas temperature rises further, even after the feed of auxiliary or additional fuel has been blocked or cut off, additional combustion air is introduced into the combustion chamber. Therewith, combustion can be maintained stationary for an air-excess number of about 1.4. This instant of time was reached about one hour after the beginning of the desorption step. The temperature of the circulatory-loop gas rose to about 350° C. at the outlet of the heat exchanger and to about 170° C. at the outlet to the adsorption filter, whereas the temperature of the combustion-chamber exhaust gas was only slightly above 850° C. After about 2 hours, timed from the beginning of the desorption phase, the temperature of the combustion-chamber exhaust-heat gas began to drop again because the yield of desorbate had diminished. From this instant on, the additional air feed was throttled, and the feed of auxiliary or additional fuel was again unblocked or resumed.

This condition was maintained for about two hours more, and the desorption step was then discontinued. Since activated carbon was introduced as adsorbent and since, with such a desorption step, an increasing irreversible loading remainder would set in necessarily due to the softening agent alone, a reactivation phase was added to this desorption phase. A result thereof was that the combustion-air feed was so throttled that the combustion proceeded with an air-excess number of about 1.2. The hot combustion-chamber exhaust gas then at about 1200° C. heated up the gas in the circulatory loop through the heat exchanger to a temperature of up to 620° C. After this temperature was reached, this operating condition was maintained for about 30 minutes. The burner was then extinguished. The temperature of the circulatory-loop gas began to fall, the heat exchanger continuing to function nevertheless as a heat exchanger, although in reverse direction. The combustion air, that had cooled off the combustion chamber in the interim, flowed through the heat exchanger instead of the exhaust gas, and was then in a position to absorb thermal energy from the cirulatory loop. The protective-gas generator which was in operation, as before, fed protective gas into the circulatory loop; this protective gas then compensated for the reduction in volume of the gas in the circulatory loop, which was caused by the temperature drop, and thus prevents penetration of oxygen-containing air into the yet hot system. After about one hour, the cooling phase is substantially discontinued, so that after a total of about 6 hours, the adsorption filter is ready to be switched over into the adsorption phase. With the method according to the invention, it is possible, in an amazingly simple, yet effective and consequently economical manner, to purify exhaust-air or exhaust-gas flows from vaporous or gaseous impurities contained therein with the aid of an adsorption filter, to desorb the adsorption filter cyclically, if necessary also to reactivate the adsorption filter and, after a cooling phase, to reuse or reapply it for adsorption purposes. The method invention of the instant application is not, however, limited to the use of one adsorption filter; if a continuously produced exhaust-air or exhaust-gas flow is to be purified, naturally, a correspondingly suitable number of adsorption filters are able to be connected together in parallel, the regeneration cycles for which being offset in time with respect to one another.

I claim:

1. Method of separating vaporous or gaseous impurities from an air or gas flow by means of an adsorption filter wherein, after the filter has attained a predetermined loading of the impurities, the combination therewith of (1) conducting an inert gas in a circulatory loop through the adsorption fulter containing impurities to desorb same; (2) removing excess gas together with desorbed components contained in the excess gas from said circulatory loop and sending same to a combustion chamber where it is consumed; and (3) supplying heat energy for the desorption of the adsorption filter by conducting indirect heat exchange between the combustion chamber exhaust gas and the inert gas in the circulatory loop.

2. Method according to claim 1 which includes measuring the temperature of the combustion-chamber exhaust gas, and supplying supplementary fuel in accordance with a control value corresponding to the measured temperature of the combustion-chamber exhaust gas.

3. Method according to claim 1 which includes measuring the temperature of the combustion-chamber exhaust gas and supplying combustion air in accordance with a control value corresponding to the measured temperature of the combustion-chamber exhaust gas.

4. Method according to claim 1 which comprises removing a partial gas flow from a flow of the exhaust gas of the combustion chamber, and feeding the partial gas flow into the circulatory loop for filling up and inertizing the circulatory loop.

* * * * *